United States Patent Office 3,241,953
Patented Mar. 22, 1966

3,241,953
ALUMINUM CONDUCTOR AND PROCESS FOR OBTAINING SAME
Michael J. Pryor and Douglas S. Keir, Hamden, and Philip R. Sperry, North Haven, Conn., assignors to Olin Mathieson Chemical Corporation
No Drawing. Filed Oct. 3, 1963, Ser. No. 313,445
9 Claims. (Cl. 75—138)

This is a continuation-in-part of application Serial No. 60,166, filed October 3, 1960, now Patent No. 3,180,728 and of application Serial No. 171,114, filed February 5, 1962, now Patent No. 3,186,836.

The present invention relates to a new and improved aluminum conductor. More particularly, the present invention resides in a new and improved aluminum wire characterized by high conductivity and surprisingly high tensile strength.

High tensile strength and high electrical conductivity are both essential in electrical conductors since electrical conductivity is the key characteristic of an aluminum conductor and high tensile strength is required in order to reduce the number of transmission line towers or poles for overhead transmission lines.

Specifically, with respect to aluminum conductors, increasing the purity of the conductor will result in an increase in electrical conductivity but a significant decrease in tensile strength. High purity aluminum has an electrical conductivity in excess of 64 percent IACS; whereas, the industrial minimum conductivity requirement for electrical conductivity (EC) grade aluminum is 61 percent IACS. However, in view of the low tensile strength of high purity aluminum it has been found necessary to include varying quantities of additional alloying ingredients. These alloying ingredients increase the tensile strength but generally reduce the electrical conductivity.

Furthermore, EC grade aluminum is seldom used as an all aluminum conductor due to insufficient strength. Aluminum alloy 5005 (aluminum–0.5 to 1.1 percent magnesium) is used as an all aluminum conductor due to higher tensile strength, e.g., around 37,000 p.s.i. hard drawn. However, this additional strength is purchased at the expense of decreased electrical conductivity, e.g., 53 to 55 percent IACS.

Even stronger is the heat treatable alloy 6201 (aluminum–0.35 to 0.8 percent magnesium–0.3 to 0.7 percent silicon) which will achieve tensile strengths as high as about 45,000 p.s.i. at about the same conductivity level as alloy 5005.

Accordingly, it is a principal object of the present invention to provide a series of improved strength aluminum conductors where the improved strength is achieved with no sacrifice of electrical conductivity.

It is a further object of the present invention to provide an improved aluminum conductor which is capable of being drawn to wires having a very small diameter while still attaining both high conductivity and surprisingly high tensile strength.

Further objects and advantages will appear hereinafter.

In accordance with the present invention it has now been found that the foregoing objects and advantages may be readily obtained and an improved aluminum conductor provided which comprises a high conductivity, high tensile strength aluminum wire having a diameter of less than 0.20 inch and containing at least 91 percent by weight of aluminum and from 0.04 to 0.3 percent by weight of tin, with the tin retained in solid solution to substantially the maximum degree. The conductors of the present invention are characterized by a minimum tensile strength of 29,000 p.s.i. at a diameter of 0.050 inch.

The foregoing aluminum and aluminum alloy conductors have surprisingly high tensile strength, and, in addition, high electrical conductivity values, for example, tensile strengths of the conductor of the present invention commonly run on the order of at least 10 to 20 percent higher than those of EC aluminum, with comparable conductivity values, and tensile strengths in excess of 30,000 p.s.i. are frequently attained. This is especially surprising and unexpected since it is seldom that the tensile strength of EC aluminum in comparable diameters will exceed 27,000 to 28,000 p.s.i. It is further especially surprising that the increase in tensile strength was accompanied by comparable levels of electrical conductivity.

Furthermore, surprisingly, for all aluminum conductors utilizing alloys 5005 or 6201, the conductors of the present invention attain tensile strength values greater than alloys 5005 and 6201 in comparable diameters with comparable conductivity values.

In addition, quite surprisingly and unexpectedly, the conductors of the present invention are characterized by more favorable A.C.–D.C. ratios than conventional aluminum and aluminum alloy conductors. This permits more bridging of current between strands thereby significantly increasing the current carrying capacity of stranded conductors of this invention.

The improved conductor of the present invention contains tin in an amount of 0.04 to 0.3 percent and aluminum in an amount of at least 91 percent by weight, preferably at least 95 percent by weight. The preferred amount of tin is from 0.1 to 0.3 percent, the optimum is about 0.2 percent. It is a critical requirement of the present invention that the tin be retained in solid solution to substantially the maximum degree, that is, the maximum degree of tin which can be retained in solid solution is about 0.1 percent.

The manner of obtaining the tin in solid solution is especially critical since normally only a small amount of tin is retained in solid solution. This manner of treatment is for convenience called a homogenization treatment. In the preferred manner of preparing the aluminum conductor the aluminum ingot is cast in a conventional manner including the requisite total quantity of tin and other alloying ingredients. The aluminum-tin sample is then held at homogenizing temperature at, for example, preferably around 1000 to 1180° F., for a sufficient period of time to dissolve the maximum amount of tin. The optimum temperature is around 1145° F. Generally, the sample is held at homogenizing temperature within the preferred temperature range for between 15 minutes and 24 hours. Optionally, the sample may be cooled to, for example, room temperature after casting and then heated to homogenizing temperature or simply brought to homogenizing temperature immediately after casting without the intermediate cooling step.

After the homogenizing step the sample is critically held at an intermediate temperature of about 600 to 800° F. for a short period of time, e.g. 10 to 360 minutes. The preferred holding time is from about 30 minutes to one hour. Optionally, the sample may be cooled to this intermediate temperature directly from the homogenization step or cooled to, for example, room temperature after the homogenization step followed by reheating to the intermediate temperature. The cooling after homogenization is a critical step and the sample must be cooled at a rate of at least 25° F. per hour. It is preferred to cool at a faster rate, for example, at least 50° F. per hour.

Thereafter the conductor can be processed in the conventional manner for EC aluminum, that is hot rolled into redraw rod of about ⅜ inch diameter and subsequently drawing to wire having the desired diameter.

The aluminum-tin conductor of the present invention preferably contains additional alloying ingredients and conventional impurities. Generally, conventional impurities which are normally in electrical conductivity aluminum are present in the conductor of the present invention, for example, an iron content of at least 0.05 percent by weight is normally present and also silicon in an amount of at least 0.01 percent by weight. Typical additional impurities frequently encountered include: copper; manganese; magnesium; titanium; vanadium; zinc; nickel; chromium; molybdenum; and zirconium. Boron is generally used in EC aluminum in general and also in the conductors of the present invention in an amount from about 0.001 to 0.05 percent in order to increase the electrical conductivity by precipitating the impurities by formation of insoluble borides.

Generally, with regard to the impurities the homogenization treatment of the present invention dissolves the tin to the maximum degree, precipitates the iron as $FeAl_3$ and the silicon in the alloy is almost completely retained in solid solution. Since silicon in solid solution has an adverse effect on electrical conductivity it is necessary to provide an intermediate temperature holding step at around 600 to 800° F. and also to permit some residual time at these elevated temperatures to enable the silicon in solid solution to react with $FeAl_3$ to form the Al-Fe-Si compound and to bring the electrical conductivity up into the neighborhood of 62 IACS characteristic of aluminum conductors. During this reheating period, some part of the tin retained in solid solution may be precipitated, thus accounting for the fact that slightly less than the maximum tin is retained in solid solution.

The present invention is applicable not only to EC grade aluminum, but also to aluminum alloys generally which are potentially useful in the conductor field.

In addition insoluble alloying ingredients may be included in the conductors of the present invention, i.e., elements which have less than 0.03 percent by weight maximum solid solubility in aluminum. Generally these may be present in an amount up to about 1 percent by weight of each element. These insoluble elements have no significant effect upon the strength advantage conferred by the dissolved tin in the conductor because they do not reduce the solid solubility of tin in aluminum.

Generally, the alloying ingredients which may be readily used in the conductors of the present invention include those soluble alloying additions, i.e., elements having greater than 0.03 percent maximum solid solubility by weight in aluminum, and which expand the aluminum lattice and thereby either maintain the maximum solubility of tin at 0.1 percent or increase it. Examples of such alloying ingredients include: magnesium from about 0.001 to 7.0 percent; zinconium from about 0.001 to 0.3 percent; bismuth from about 0.001 to 0.3 percent; and indium from about 0.001 to 0.5 percent; and mixtures thereof.

Solid, soluble lattice contractors generally reject tin from solid solution and detract from the strength advantage conferred by the dissolved tin, but small amounts may be tolerated, for example, zinc; from about 0.001 to 0.05 percent; copper from about 0.001 to 0.01 percent; silicon from about 0.001 to 0.2 percent; and manganese, from about 0.001 to 0.1 percent.

The present invention will be more readily apparent from a consideration of the following illustrative examples.

EXAMPLE 1

This example describes a representative preparation of the aluminum-tin conductor of the present invention.

An aluminum ingot was prepared using commercial 99.83 percent pure aluminum and adding the tin alloying addition in the requisite quantity. When analyzed after casting this alloy contained 0.21 percent tin, 0.11 percent iron, 0.05 percent silicon, 0.007 percent boron and 99.62 percent aluminum.

The ingot was given a homogenization heat treatment of 620° C. for about 16 hours and then quenched in still water to room temperature. The ingot was then reheated to 680° F. and held in the temperature range of 600 to 800° F. for 3½ hours. The ingots were then hot rolled at 680° F. to ⅜ inch redraw rod. The redraw rod was then drawn down to wire having a diameter range from 0.2 inch to 0.051 inch without intermediate annealing.

EXAMPLE 2

The following example describes a representative preparation of conventional electrical conductivity aluminum. The aluminum used was 99.83 percent pure and alloying additions in the requisite quantities were added. When analyzed after casting this alloy contained 0.11 percent iron, 0.05 percent silicon, 0.007 percent boron and 99.83 percent aluminum. The cast ingot was reheated to 690° F., held within the temperature range of 600 to 800° F. for 3½ hours and then hot rolled to ⅜ inch redraw rod and drawn down to wire in the same manner as the ingot of Example 1.

EXAMPLE 3

The wires of Example 1 and Example 2 were tested for tensile strength and electrical conductivity at various diameters. The following table shows the results:

Table 1

| Wire Tested | Diameter of Wire | Tensile Strength, p.s.i. | Electrical Conductivity |
| --- | --- | --- | --- |
| Example 1 | 0.19375 | 28,400 | 61.9 |
| Example 2 | 0.19375 | 22,400 | 62.2 |
| Example 1 | 0.1705 | 30,100 | 62.0 |
| Example 2 | 0.1705 | 23,500 | 62.1 |
| Example 1 | 0.1485 | 31,000 | 62.0 |
| Example 2 | 0.1485 | 24,600 | 62.1 |
| Example 1 | 0.1325 | 32,400 | 61.9 |
| Example 2 | 0.1325 | 25,500 | 62.1 |

EXAMPLE 4

In a manner after Example 1 an aluminum conductor wire was prepared having the same composition as in Example 1. The wire was prepared in the same manner except that the homogenization and treatment was omitted, i.e., the tin was not in solid solution. The tensile strength and electrical conductivity of this wire were compared with the wire of Example 1 where the tin was in solid solution with results as follows:

Table 2

| Wire Tested | Diameter of Wire | Tensile Strength, p.s.i. | Electrical Conductivity |
| --- | --- | --- | --- |
| Example 1 | 0.1325 | 32,400 | 61.9 |
| Example 4 | 0.1325 | 26,850 | 62.3 |

EXAMPLE 5

The wire of Example 1 at 0.076″ diameter was stranded into 7 over 1 ACSR over galvanized and aluminized steel core wire. A.C. resistance was tested in comparison with EC aluminum of the same diameter from Example 2, stranded over an identical galvanized steel core wire. A.C. resistance was tested by standard methods and is as shown below.

Table 3

| Conductor | Temperature, °C. | Stranded Conductor Resistance, ohms per 1,000 ft. | Percent Decrease in Stranded Conductor Resistance | D.C. Conductivity of Aluminum Outer Strands |
|---|---|---|---|---|
| Ordinary ACSR galvanized core | 40 | 0.431 |  | 62.1 |
| Al-Sn/galvanized core | 40 | 0.419 | 2.78 | 61.9 |
| Al-Sn/aluminized core | 40 | 0.418 | 3.02 | 61.9 |
| Ordinary ACSR galvanized core | 50 | 0.452 |  | 62.1 |
| Al-Sn/galvanized core | 50 | 0.439 | 2.88 | 61.9 |
| Al-Sn/aluminized core | 50 | 0.440 | 2.65 | 61.9 |

Thus, the foregoing shows that the increased A.C. current carrying capacity of the stranded conductor with the alloy of the present invention over converted ACSR in spite of a slightly adverse D.C. conductivity. These improved conductor characteristics are due to the lowered A.C. resistance of the outer surface oxide film upon the Al-Sn alloys which result in more bridging current from strand to strand.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An aluminum conductor comprising a high conductivity, high tensile strength aluminum wire having a diameter of less than 0.2 inch and consisting essentially of from 0.04 to 0.3 percent by weight of tin, and the remainder aluminum with the tin retained in solid solution to the maximum degree at room temperature, said maximum degree being 0.1 percent.

2. An aluminum conductor according to claim 1 wherein said tin is present in an amount of from 0.1 to 0.3 percent by weight.

3. An aluminium conductor according to claim 1 containing at least 00.5 percent iron and at least 0.001 percent silicon.

4. An aluminum conductor according to claim 1 containing from 0.001 to 0.05 percent boron.

5. An aluminum conductor according to claim 1 containing a material selected from the group consisting of magnesium from 0.001 to 7.0 percent; zirconium from 0.001 to 0.3 percent; bismuth from 0.001 to 0.3 percent; indium from 0.001 to 0.5 percent; zinc from 0.001 to 0.05 percent; copper from 0.001 to 0.01 percent; silicon from 0.001 to 0.2 percent; manganese from 0.001 to 0.1 percent; and mixtures thereof.

6. A process for forming a high conductivity, high tensile strength aluminum wire which comprises: casting an aluminum ingot consisting essentially of from 0.04 to 0.3 percent tin and the remainder aluminum; homogenizing said ingot by holding at an elevated temperature of from 1000 to 1180° F. for from 15 minutes to 24 hours; cooling to an intermediate temperature of from 600 to 800° F. at a rate of at least 25° F. per hour; holding at said intermediate temperature for from 10 to 360 minutes; and fabricating into wire having a diameter of less than 0.2 inch.

7. A process according to claim 6 wherein said ingot is cooled to room temperature after casting, followed by heating to said homogenization temperature.

8. A process according to claim 6 wherein said ingot is cooled to room temperature after homogenizing, followed by heating to said intermediate temperature.

9. A process according to claim 7 wherein said cooling rate is at least 50° F. per hour.

References Cited by the Examiner
UNITED STATES PATENTS

| 2,087,992 | 7/1937 | Nock | 148—159 |
| 2,242,944 | 5/1941 | Dix et al. | 148—159 |
| 2,886,432 | 5/1959 | Schmidt et al. | 75—138 |

DAVID L. RECK, *Primary Examiner.*

HYLAND BIZOT, *Examiner.*

R. O. DEAN, *Assistant Examiner.*